UNITED STATES PATENT OFFICE.

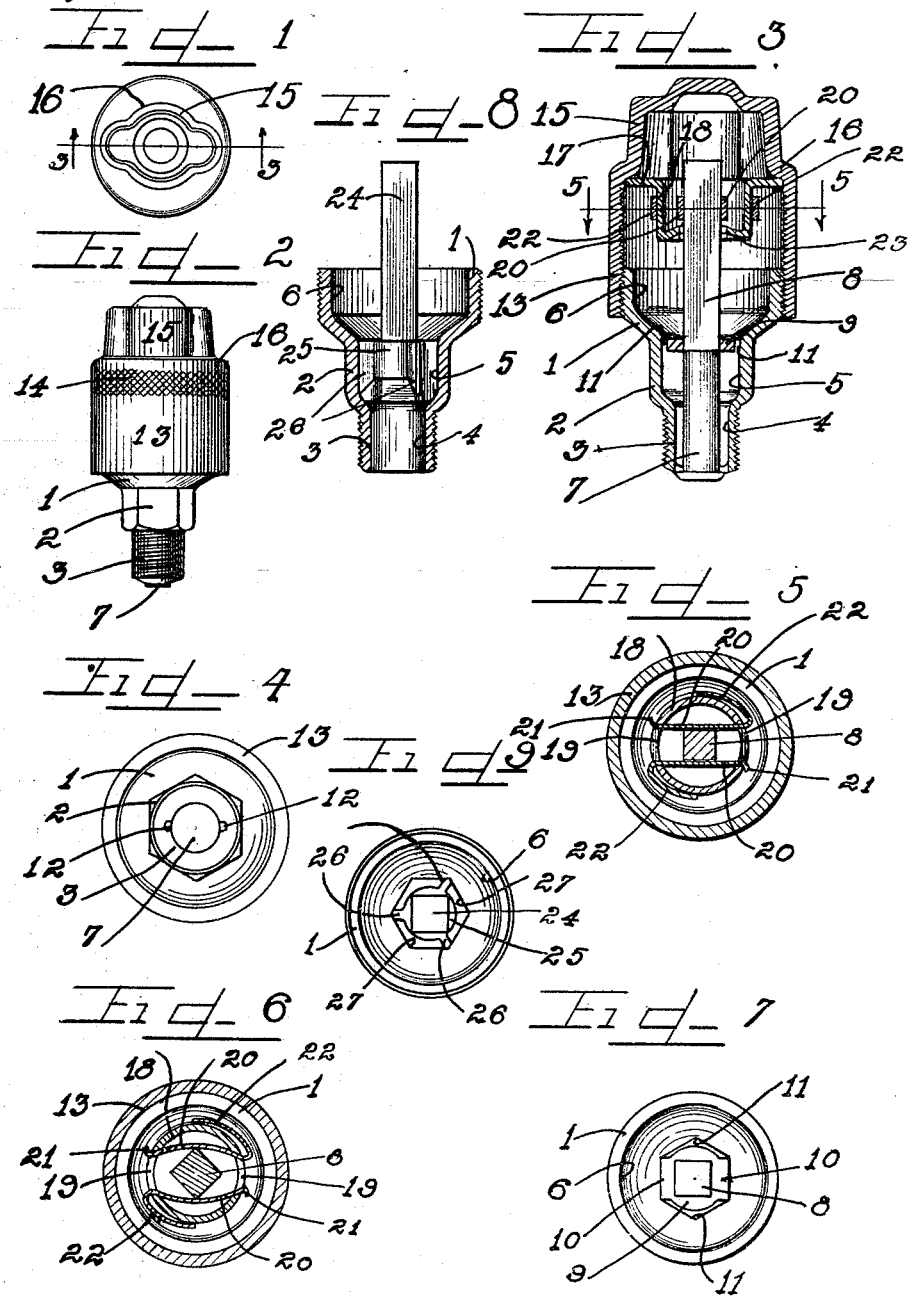

SIDNEY DAWSON, OF CHICAGO, ILLINOIS, ASSIGNOR OF ONE-HALF TO WILLIAM ROBERTSON, OF CHICAGO, ILLINOIS.

GREASE-CUP.

1,268,688.   Specification of Letters Patent.   Patented June 4, 1918.

Application filed May 31, 1917. Serial No. 171,882.

*To all whom it may concern:*

Be it known that I, SIDNEY DAWSON, a subject of the King of Great Britain, and a resident of the city of Chicago, in the county of Cook and State of Illinois, have invented certain new and useful Improvements in Grease-Cups; and I do hereby declare that the following is a full, clear, and exact description of the same, reference being had to the accompanying drawings, and to the numerals of reference marked thereon, which form a part of this specification.

This invention relates to an improved form of grease cup wherein resilient spring members are positioned within the grease cup cap to springingly contact a squared stem rigidly secured in the outlet base of the grease cup, to prevent the cap from being worked upwardly off of the base, due to jarring and vibratory actions of the engine upon which the grease cup is mounted, said spring members and squared stem thus affording a locking means for holding the cap in a predetermined adjusted position, from which it can be moved only by manually turning the cap to overcome the resistance of said locking means when it is desired to force grease from the grease cup to the engine parts requiring lubrication.

It is an object of this invention to construct a grease cup manually operatable only.

It is also an object of this invention to provide a grease cup wherein movably interfitting members are provided with means for preventing the grease cup cap from working its way off of the grease cup base.

It is a further object of this invention to construct a force feed grease cup comprising interfitting members prevented from forcing grease from the cup by telescoping with one another due to vibratory or jarring actions, by resilient means within the grease cup which permit force feeding by the grease cup only when one of said members is manually actuated to telescope over the other member.

It is furthermore an object of this invention to construct a force feeding grease cup wherein interfitting grease container members are each provided with a means on the interior thereof engaging one another to permit one of said members to be telescoped over the other to force grease therefrom only by manually actuating said first mentioned member.

It is an important object of this invention to provide a force feed grease cup simple and inexpensive of construction, embracing a base and a grease container cap adapted to be threaded thereover to force grease therefrom by manual force exerted against resilient means disposed within the cup for preventing the cap from gradually working its way off of the grease cup base, due to vibratory or other actions.

Other and further important objects of the invention will be apparent from the disclosures in the drawings and specification.

The invention (in a preferred form) is illustrated in the drawings, and hereinafter more fully described.

On the drawings:

Figure 1 is a top plan view of a grease cup embodying the principles of this invention.

Fig. 2 is a side view thereof.

Fig. 3 is an enlarged section taken on line 3—3, of Fig. 1, with parts shown in elevation.

Fig. 4 is a bottom plan view of the device.

Fig. 5 is a section taken on line 5—5, of Fig. 3, with the cap rotated through an angle of ninety degrees showing the springs in released position.

Fig. 6 is a similar section showing the relative position of parts when the cap is rotated into a position wherein the springs are stressed.

Fig. 7 is a top plan view of the base of the grease cup with the cap removed.

Fig. 8 is a vertical section taken through the base of a modified form of grease cup, with parts shown in elevation.

Fig. 9 is a top plan view thereof.

As shown on the drawings:

The reference numeral 1, designates an externally threaded metal container or cup, having integrally formed on the bottom thereof a hollow nut portion 2, of reduced diameter, on the lower end of which is integrally formed an externally threaded mounting tip or shank 3, of a diameter less than that of the nut 2, said shank being provided with a central passage 4, to communicate with a chamber 5, in said nut. The cup chamber designated by the numeral 6, together with the chamber 5, and passage 4, thus afford a continuous funnel shaped passage through said integrally connected members forming the base of the device. Projecting axially through the passage 4, and chambers 5 and 6, is a metal axle or pin 7, the lower portion extending through the nut 2, and shank 3, being round and having the lower end thereof projecting through the bottom of the shank 3, and expanded to be flush therewith for rigidly holding the lower end of the pin 7, in position. The upper end of the pin 7, is square or of angular cross-section to afford a stem 8, which projects upwardly through the chamber 6, for a considerable distance above the cup 1, as shown in Fig. 3, and is rigidly braced or held in position by means of a brace plate 9, provided with oppositely disposed integral attaching lugs 10. The brace plate 9, is brazed or soldered to the pin 7, at the meeting point of the round pin 7, with the squared stem 8, to permit the lugs 10, to be rigidly secured by brazing or other suitable means to opposite sides of the inner surface of the nut 2, and at the upper end thereof to afford oppositely disposed restricted openings 11, between the edges of the brace plate 9, and the interior surface of said nut, said openings providing a means of communication between the cup chamber 6, and the nut chamber 5. Drilled or cut in the bottom of the shank 3, on opposite sides of the expanded lower end of the pin 7, are apertures or outlets 12, communicating with the shank passage 4.

An interiorly threaded grease container or cap 13, provided with a knurled circumferential portion 14, and a closed chambered head 15, integrally formed on the upper end thereof, is removably threaded upon the threaded cup 1, to telescope thereover, with the squared stem 8, projecting centrally through said cap 13, and into said head 15. Rigidly sprung within the cap 13, or held seated therein, by solder or other suitable means against the inner surface of a top wall 16, formed by bending the upper end of the cap 13, inwardly to connect with the head 15, is a washer or centrally apertured retainer plate 17, having integrally formed centrally thereon a downwardly projecting cylindrical casing or shell 18, provided with oppositely disposed short arc slots 19, to permit springs or resilient metal strips or bands 20, to project therethrough and through said casing 18, parallel to one another on opposite sides of the squared stem 8, and normally flatly contacting two of the opposite sides of said stem, as shown in Fig. 5. The ends of each of said springs 20, are bent over to afford a short clip or retaining prong 21, at one end, of each of said springs, while the opposite end is of a length sufficient to afford a resilient hook or arm 22, to frictionally extend around the exterior of the casing 18, to a point half way between the slots 19, said springs 20, being disposed alternately with respect to one another with the like ends thereof diametrically opposite each other. The lower rim of the casing 18, is bent inwardly and upwardly to form an annular guide flange 23, through which the stem 8, projects.

In the modified form of device shown in Figs. 8 and 9, the construction of the base and cap of the grease cup is the same as that shown in Figs. 1 to 7, inclusive, with the exception that the pin 7, stem 8, and brace plate 9, are replaced by a squared stem 24, having integrally formed on the lower end thereof a brace or spider, comprising a cylindrical stub or body portion 25, provided with a plurality of radially disposed ribs or attaching lugs 26, adapted to be frictionally forced against the inner walls of the nut 2, to rigidly hold the stem 24, axially disposed within the grease cup base and projecting thereabove as shown in Fig. 8, said ribs 26, affording a plurality of restricted openings 27, between the inner walls of the nut 2, and the cylindrical body portion 25, to permit grease from the cup chamber 6, to pass downwardly into the chamber 5, between the respective ribs 26, and out through the shank passage 4, to the parts to be lubricated.

The operation is as follows:

When it is desired to use a grease cup, as described, on an engine or other mechanism requiring lubricating, the base portion of the device is mounted by threading the shank 3, into a suitable aperture provided in the engine for the purpose, by means of a wrench engaging the nut 2, to tightly secure the base in a vertical position. The cup chamber 6, and the cap chamber below the plate 17, may now be filled with grease, after which the cap 13, the inner wall of which is threaded up to the plate 17, is now threaded upon the exteriorly threaded cup 1, with the squared stem 8, projecting through the guide flange 23, and between the springs 20, which contact the same. By manually rotating the container cap 13, downwardly to telescope over the interfitting cup 1, the springs 20, are alternately contacted by the sides and edges of the stem 8, the edges of which are thus repeatedly forced against the normally parallel springs 20, deflecting or stressing the same outwardly away from one another with each quarter turn of the cap, as shown in Fig. 6, to resist the gradual downward or upward movement of the cap 13, over the stem 8, and the cup 1. Since the manual force exerted upon the cap 13, is sufficient to overcome the resistance of the springs 20, the downward movement of the cap causes pressure to be exerted upon the grease within the cup, which is forced in small quantities through the restricted openings 11, through the chamber 5, and passage 4, and out through the outlets 12, to the parts requiring lubrication.

It will accordingly be seen that the stem 8, in combination with the resilient springs 20, provide a means for locking or preventing the cap 13, from moving downwardly of its own accord over the cup 1, due to its own weight, or upwardly off of the cup due to the jarring and vibratory actions of the engine, or other causes. The springs 20, are of sufficient strength to withstand the jarring and vibrating actions of the parts upon which the grease cup is mounted, and by clamping against opposite sides of the stem 8, hold the cap 13, stationary in a predetermined or adjusted position, from which position it can be rotatably moved either downwardly or upwardly by manually turning the knurled cap 13, in the desired direction with sufficient force to overcome the resistance of the locking springs.

The operation of the modified form of the device shown in Figs. 8 and 9, is the same as that above described, except that the springs 20, engage the stem 24, to prevent the grease cup cap 13, from working its way off of the cup 1, due to the jarring or vibratory actions of the parts. When it is desired to feed grease to the parts upon which the grease cup is mounted, the cap 13, is manually turned to overcome the resistance of the springs 20, thus forcing grease from the chamber 6, through the restricted outlet openings 27, and out through the shank passage 3.

I am aware that various details of construction may be varied through a wide range without departing from the principles of this invention, and I therefore do not purpose limiting the patent granted otherwise than necessitated by the prior art.

I claim as my invention:

1. A grease cup comprising interfitting grease containers, a square stem secured to one container, apertured means secured to the other container, and a plurality of leaf springs supported by said means and projecting therethrough to contact opposite sides of the square stem.

2. A grease cup comprising a base member, a cap member, a stem secured to the base member having flat faces, a cylinder having slots therein secured to the cap, and oppositely disposed leaf springs projecting through said slots and secured to the cylinder bearing against opposite square faces of the stem.

3. In a grease cup a base cup member, a cap cup member, a squared stem, a member securing the same to the base cup member adapted to admit grease therepast through the base member, a cylindrical casing secured to the cap cup member through which the stem extends, said casing having oppositely disposed slots therein, spring members extending through the slots in the cylindrical casing bearing against opposite sides of the square stem and the springs at one end bearing against the outside of the casing.

4. A grease cup comprising a base cup having a restricted passage, a guide member in the passage through which the grease is adapted to be forced, a stem secured to the guide member, a cup adapted to be threaded onto the base, a cylindrical member secured thereto to receive the stem therethrough, and resilient bands secured to the cylindrical member and frictionally contacting the stem.

In testimony whereof I have hereunto subscribed my name in the presence of two subscribing witnesses.

SIDNEY DAWSON.

Witnesses:
CHARLES W. HILLS, Jr.,
EARL M. HARDINE.

Copies of this patent may be obtained for five cents each, by addressing the "Commissioner of Patents, Washington, D. C."